(12) United States Patent
Lee et al.

(10) Patent No.: US 7,715,163 B2
(45) Date of Patent: May 11, 2010

(54) ELECTRONIC SYSTEM AND CELL MODULE THEREOF

(75) Inventors: Min-Wei Lee, Taipei (TW); Hsiang-Pin Tseng, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 12/155,696

(22) Filed: Jun. 9, 2008

(65) Prior Publication Data

US 2008/0316667 A1 Dec. 25, 2008

(30) Foreign Application Priority Data

Jun. 20, 2007 (TW) ............... 96122197 A

(51) Int. Cl.
*H02H 9/08* (2006.01)
(52) U.S. Cl. .............. 361/93.9; 361/57; 361/58; 361/93.1; 361/111
(58) Field of Classification Search ........ 361/93.1, 361/57, 58, 93.9, 100, 111
See application file for complete search history.

(56) References Cited

U.S. PATENT DOCUMENTS

| | | | | | |
|---|---|---|---|---|---|
| 5,376,831 | A | * | 12/1994 | Chen | 327/379 |
| 5,703,769 | A | * | 12/1997 | Murray | 363/50 |
| 5,754,797 | A | * | 5/1998 | Takahashi | 710/302 |
| 6,008,550 | A | * | 12/1999 | Dorsey et al. | 307/141 |
| 6,335,654 | B1 | * | 1/2002 | Cole | 327/546 |
| 7,324,316 | B2 | * | 1/2008 | Chen et al. | 361/93.9 |
| 2004/0032701 | A1 | | 2/2004 | Yoshida | |

FOREIGN PATENT DOCUMENTS

JP 05-276657 10/1993

* cited by examiner

*Primary Examiner*—Jared J Fureman
*Assistant Examiner*—Terrence R Willoughby

(57) ABSTRACT

An electronic system and a cell module thereof are provided. The electronic system includes an electronic device and a cell module. The cell module includes a cell, a discharge switching circuit, and a surge current suppressed and controlled circuit. The discharge switching circuit is coupled to the cell. The surge current suppressed and controlled circuit is used for controlling the discharge switching circuit, so that the current flowing from the cell into the electronic device gradually increases by the discharge switching circuit when the electronic device is coupled to the discharge switching circuit.

21 Claims, 7 Drawing Sheets

ELECTRONIC SYSTEM AND CELL MODULE THEREOF

This application claims the benefit of Taiwan application Serial No. 96122197, filed Jun. 20, 2007, the subject matter of which is incorporated herein by reference.

BACKGROUND OF THE INVENTION

1. Field of the Invention

The invention relates to an electronic system and a cell module thereof and, more particularly, to an electronic system and a cell module thereof with a surge current suppressed and controlled circuit.

2. Description of the Related Art

Please refer to FIG. 1 which is a block diagram showing a conventional electronic system. The conventional electronic system 10 includes an electronic device 110 and a conventional cell module 120. The conventional cell module 120 is used for providing the power needed by the electronic device 110, and the electronic device 110 may be, for example, a notebook, a digital video camera, a digital camera, a personal digital assistant (PDA) and so on.

Please refer to FIG. 2 which is a diagram showing an oscillogram of surge current produced at the moment that a conventional cell module is coupled to an electronic device. However, since the conventional cell module 120 begins to charge energy storage elements in the electronic device 110 the moment that the conventional cell module 120 is coupled to the electronic device 110 as shown in FIG. 1, the surge current which runs up more than 10 amperes and is produced in a few moment flows into the electronic device 110. Thus the electronic components through which the surge current flows are burnt down because of the overload of the current.

BRIEF SUMMARY OF THE INVENTION

The invention relates to an electronic system and a cell module thereof with a surge current suppressed and controlled circuit. The surge current suppressed and controlled circuit suppresses the surge current which is produced the moment that the cell module is coupled to the electronic device, and then security of the cell module and the electronic device can be assured.

According to the invention, a cell module is provided. The cell module is applied to an electronic device, and the cell module includes a cell, a discharge switching circuit, and a surge current suppressed and controlled circuit. The discharge switching circuit is coupled to the cell, and the surge current suppressed and controlled circuit is used for controlling the discharge switching circuit. Thus, the current flowing from the cell into the electronic device is gradually increased by the discharge switching circuit when the electronic device is coupled to the discharge switching circuit.

According to the invention, an electronic system is provided. The electronic system comprises an electronic device and a cell module. The cell module includes a cell, a discharge switching circuit, and a surge current suppressed and controlled circuit. The discharge switching circuit is coupled to the cell. The surge current suppressed and controlled circuit is used for controlling the discharge switching circuit, and then the current flowing from the cell into the electronic device is gradually increased by the discharge switching circuit when the electronic device is coupled to the discharge switching circuit.

These and other features, aspects, and advantages of the present invention will become better understood with regard to the following description, appended claims, and accompanying drawings.

DETAILED DESCRIPTION OF THE EMBODIMENTS

Figure 1:
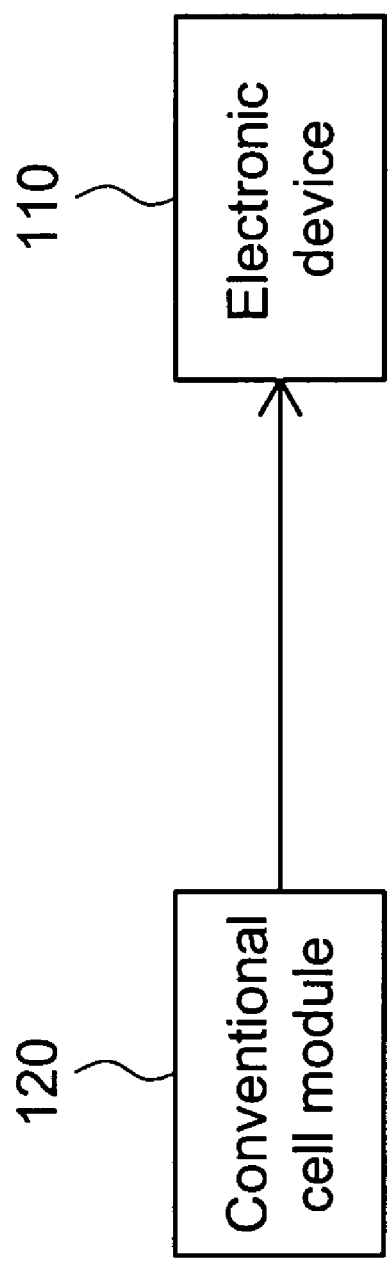
FIG. 1 is a block diagram showing a conventional electronic system.
Figure 2:
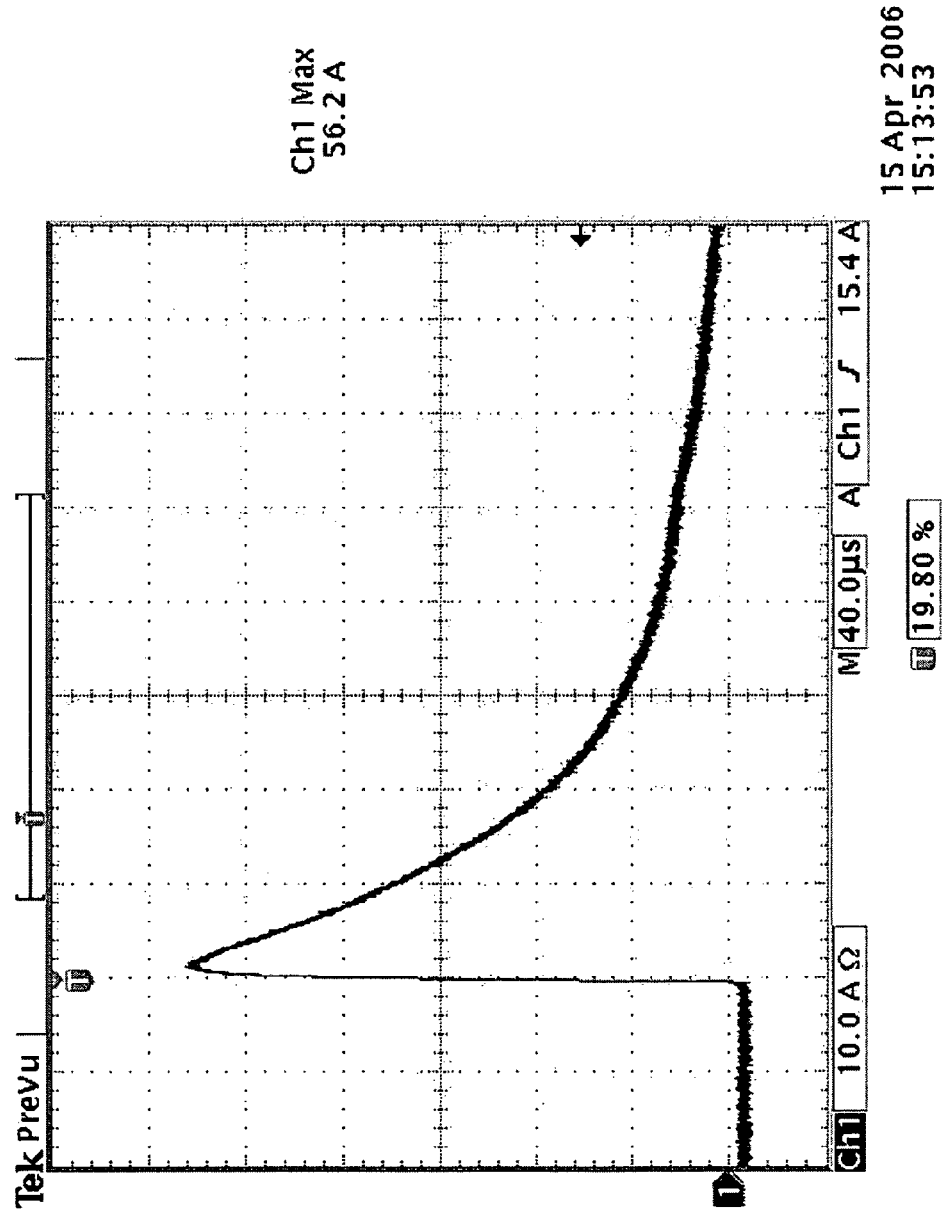
FIG. 2 is a diagram showing an oscillogram of surge current produced at the moment that a conventional cell module is coupled to an electronic device.
Figure 3:
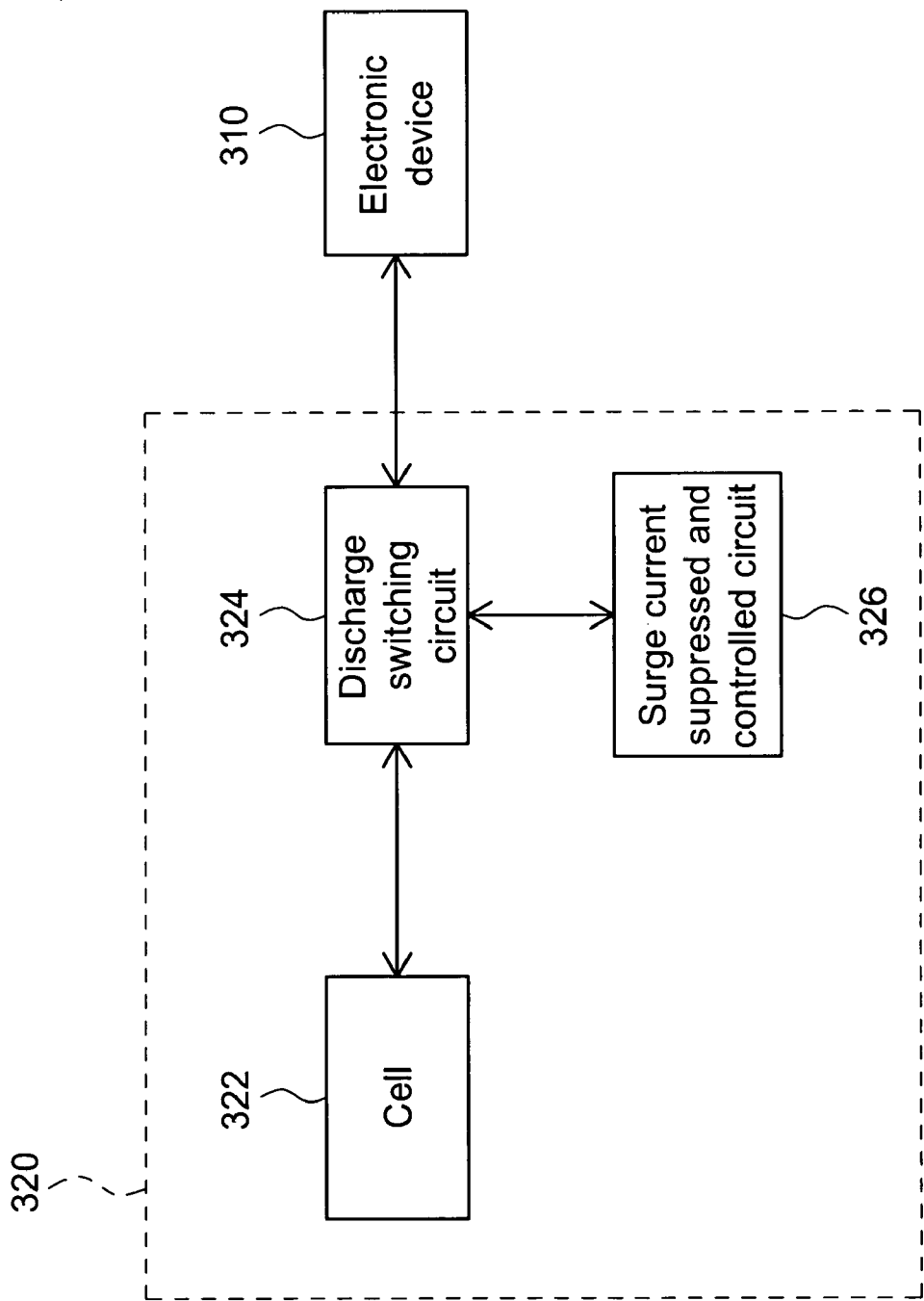
FIG. 3 is a block diagram showing an electronic system according to a preferred embodiment of the invention.

Please refer to FIG. 3 which is a block diagram showing an electronic system according to a preferred embodiment of the invention. The electronic system 30 includes an electronic device 310 and a cell module 320, and the cell module 320 includes a cell 322, a discharge switching circuit 324, and a surge current suppressed and controlled circuit 326. The discharge switching circuit 324 is coupled to the cell 322, and the cell 322 discharges electricity to the electronic device 310 via the discharge switching circuit 324.

To avoid producing too large surge current the moment that the cell module 320 is coupled to the electronic device 310, the surge current suppressed and controlled circuit 326 controls the discharge switching circuit 324. Then, the current flowing from the cell 322 into the electronic device 310 is allowed to gradually increase by the discharge switching circuit 324 when cell module 320 is coupled to the electronic device 310.

Figure 4:
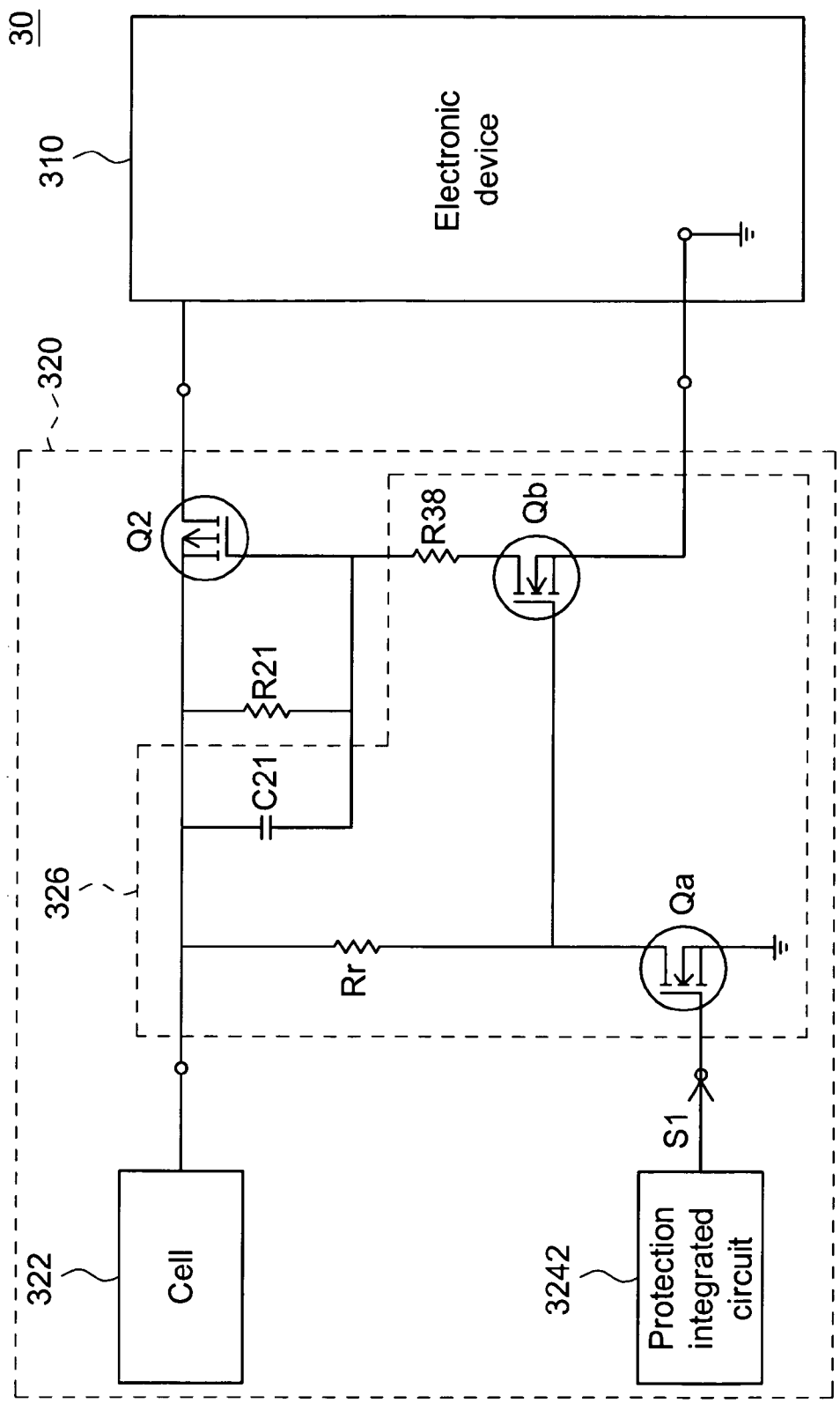
FIG. 4 is a diagram showing part of a circuit of a cell module according to a preferred embodiment of the invention.

Please refer to FIG. 4 which is a diagram showing part of a circuit of a cell module according to a preferred embodiment of the invention. The discharge switching circuit 324 as shown in FIG. 3 includes a transistor Q2, a resistor R21, and a protection integrated circuit 3242. However, persons having ordinary skill in the art should know that the protection integrated circuit 3242 is only an example of additional technology of the invention, and it is not used for narrowing the scope of the invention. The surge current suppressed and controlled circuit 326 as shown in FIG. 3 includes a capacitor C21, a resistor R38, a resistor Rr, a transistor Qa, and a transistor Qb.

The transistor Q2 may be, for example, a P-type metal-oxide-semiconductor field-effect transistor (MOSFET), and the transistor Qa and the transistor Qb may be, for example, N-type MOSFETS. Two ends of the capacitor C21 and the resistor R21 are coupled to a source electrode and a gate electrode of the transistor Q2, respectively. The value of the capacitor C21 may be, for example, between 0.1 μF and 0.4 μF, and the value of the resistor R21 may be, for example, 470 KΩ. A drain electrode of the transistor Qb is coupled to the gate electrode of the transistor Q2 via the resistor R38, and a gate electrode of the transistor Qb is coupled to the source electrode of the transistor Q2 via the resistor Rr.

A source electrode and a drain electrode of the transistor Qa are coupled to a grounding terminal and the gate electrode of the transistor Qb, respectively. When the cell module 320 is coupled to the electronic device 310, a drain electrode of the transistor Q2 and a source electrode of the transistor Qb are respectively coupled to the electronic device 310, and the source electrode of the transistor Qb may be, for example, coupled to a system grounding terminal in the electronic device 310.

Please refer to FIG. 4 continuously. When the cell module 320 discharges electricity to the electronic device 310, the transistor Qb is turned on and the transistor Qa is turned off, and voltage between the two ends of the capacitor C21 gradually increases to soft turn on the transistor Q2.

In other words, the transistor Q2 is not completely turned on in a moment, and the current flowing into the electronic device 310 increases gradually along with the voltage between the two ends of the capacitor C21 increases. Thus the peak value of the surge current can be suppressed to avoid the situation that the electronic components through which the surge current flows are burnt down because of the overload of the current.

The aforementioned surge current suppressed and controlled circuit 326 not only can suppress the peak value of the surge current, but also can cut off the current flowing into the electronic device according to an over-discharged signal S1 output by the protection integrated circuit 3242 when the value of the current flowing into the electronic device 310 is greater than a predetermined value.

Please refer to FIG. 4 continuously. When the cell module 320 over-discharges electricity to the electronic device 310, the protection integrated circuit 3242 outputs the over-discharged signal S1 to the surge current suppressed and controlled circuit 326 to turn on the transistor Qa and to turn off the transistor Qb. After the transistor Qb is turned off, the voltage between the two ends of the capacitor C21 decreases to turn off the transistor Q2 thus to cut off the current flowing into the electronic device 310.

Figure 5:
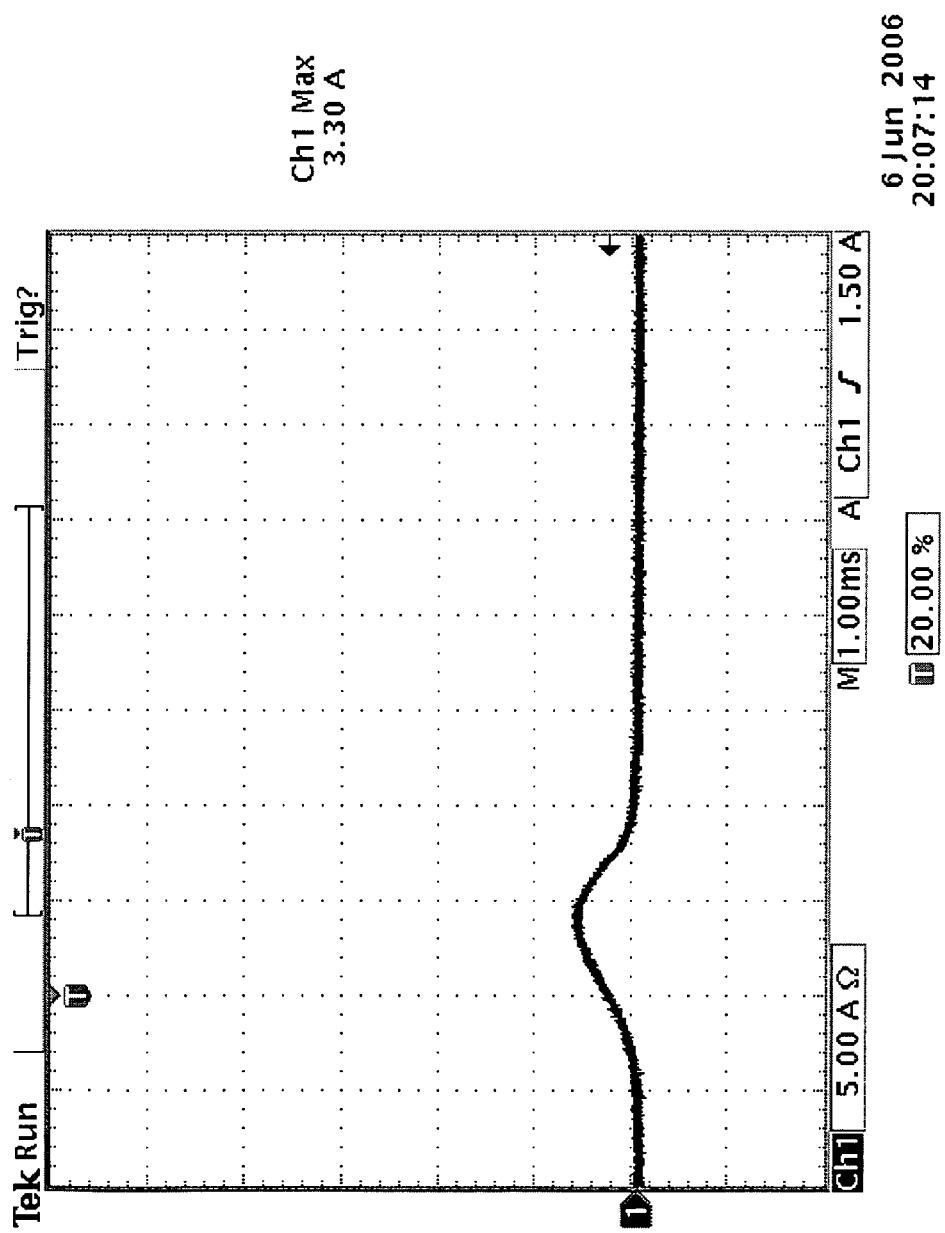
FIGS. 5, 6, and 7 are diagrams respectively showing measured oscillograms of surge current according to preferred embodiments of the invention.
Figure 6:
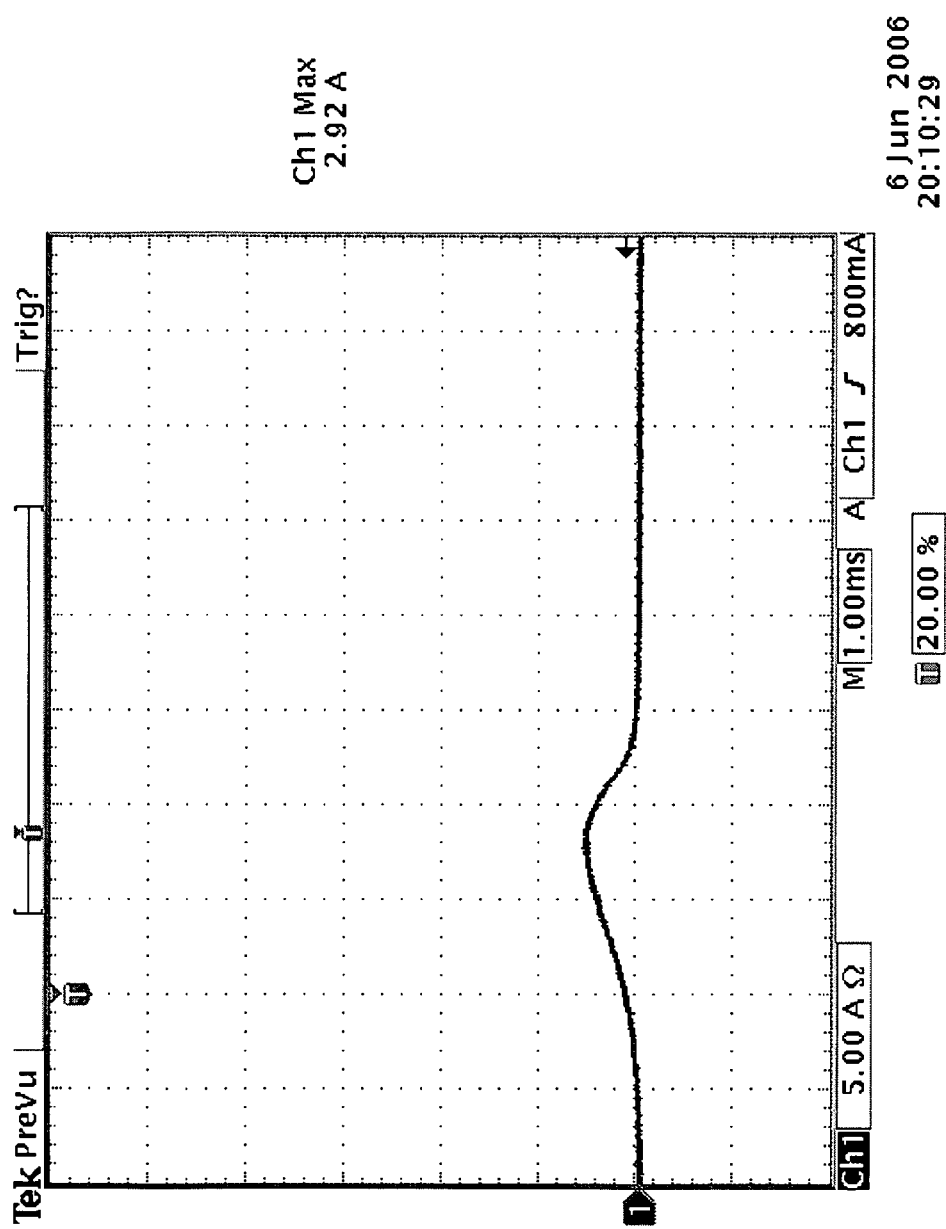
Figure 7:
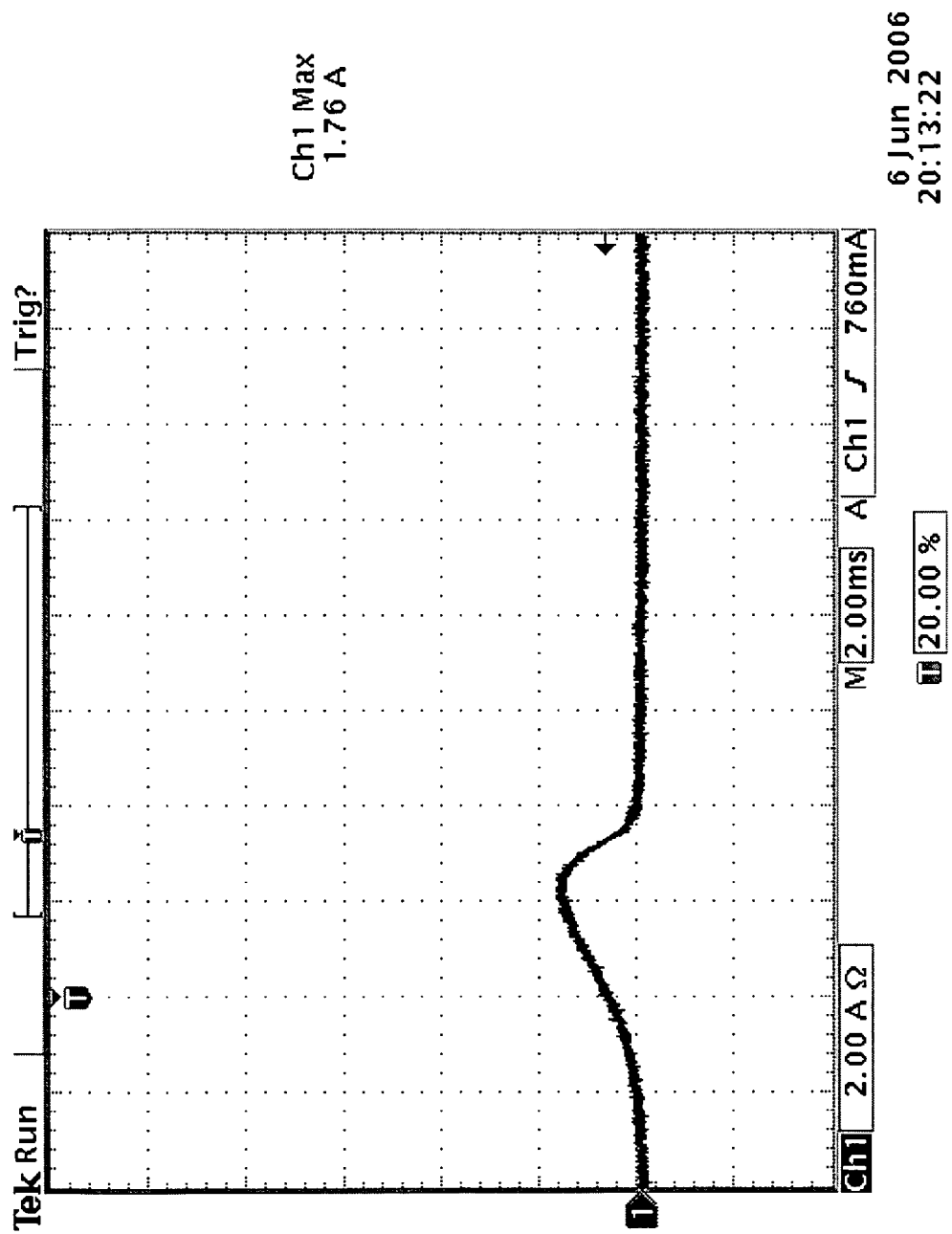

Please refer to FIGS. 5, 6, and 7 which are diagrams respectively showing measured oscillograms of surge current according to preferred embodiments of the invention. When the values of the resistor R21 and the capacitor C21 shown in FIG. 4 are 470 KΩ and 0.1 µF, respectively, the peak value of the surge current is only 3.3 A (as shown in FIG. 5). When the values of the resistor R21 and the capacitor C21 shown in FIG. 4 are 470 KΩ and 0.2 µF, respectively, the peak value of the surge current decreases to 2.92 A. When the values of the resistor R21 and the capacitor C21 shown in FIG. 4 are 470 KΩ and 0.4 µF, respectively, the peak value of the surge current decreases to 1.76 A. Compared with the surge current produced in the prior art, the peak value of the surge current can be effectively suppressed in the embodiments, and then security of the cell module and the electronic device can be assured.

The cell module according to the embodiments of the invention not only can suppress the peak value of the surge current, but also can cut off the current flowing into the electronic device when the current flowing into the electronic device is greater than a predetermined value. Thus, security of the cell module and the electronic device can be assured.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A cell module applied to an electronic device, the cell module comprising:
    a cell;
    a discharge switching circuit, coupled to the cell, comprising at least a first transistor which electrically connects the cell and the electronic device when the cell module discharges; and
    a surge current suppressed and controlled circuit for controlling the discharge switching circuit, wherein the current flowing from the cell into the electronic device gradually increases by the discharge switching circuit when the electronic device is coupled to the discharge switching circuit, wherein the surge current suppressed and controlled circuit comprises:
        at least a capacitor, coupled to a source electrode and a gate electrode of the at least the first transistor, wherein a voltage across the at least the capacitor gradually increases to soft turn on the at least the first transistor for discharging of the cell and to suppress a surge current flowing into the electronic device when the cell module discharges electricity to the electronic device.

2. The cell module according to claim 1, wherein the discharge switching circuit comprises a protection integrated circuit, and when the value of the current flowing into the electronic device is greater than a predetermined value, the protection integrated circuit outputs an over-discharged signal to the surge current suppressed and controlled circuit to cut off the current flowing into the electronic device.

3. The cell module according to claim 1, wherein a grounding terminal of the surge current suppressed and controlled circuit is coupled to a system grounding terminal of the electronic device.

4. The cell module according to claim 1, wherein the surge current suppressed and controlled circuit is used for controlling the first transistor to be soft turned on to suppress the surge current flowing into the electronic device.

5. The cell module according to claim 4, wherein the first transistor is a P-type metal-oxide-semiconductor field-effect transistor (MOSFET).

6. The cell module according to claim 1, wherein the surge current suppressed and controlled circuit further comprises:
    a second transistor, wherein a source electrode of the second transistor is coupled to a grounding terminal when the electronic device is coupled to the discharge switching circuit;
    a first resistor, wherein a drain electrode of the second transistor is coupled to the gate electrode of the first transistor via the first resistor; and
    a second resistor, wherein a gate electrode of the second transistor is coupled to the source electrode of the first transistor via the second resistor.

7. The cell module according to claim 6, wherein the second transistor is an N-type MOSFET.

8. The cell module according to claim 6, wherein the surge current suppressed and controlled circuit further comprises:
    a third transistor, wherein the third transistor is controlled by an over-discharged signal, and a drain electrode and a source electrode of the third transistor are coupled to the gate electrode of the second transistor and the grounding terminal, respectively.

9. The cell module according to claim 1, wherein the discharge switching circuit further comprises a protection integrated circuit, and when the value of the current flowing into the electronic device is greater than a predetermined value, the protection integrated circuit outputs an over-discharged signal to the surge current suppressed and controlled circuit which controls the first transistor to be turned off according to the over-discharged signal.

10. The cell module according to claim 9, wherein the surge current suppressed and controlled circuit further comprises:
a second transistor, wherein a source electrode of the second transistor is coupled to a grounding terminal when the electronic device is coupled to the discharge switching circuit;
a first resistor, wherein a drain electrode of the second transistor is coupled to the gate electrode of the first transistor via the first resistor;
a second resistor, wherein a gate electrode of the second transistor is coupled to the source electrode of the first transistor via the second resistor; and
a third transistor, wherein the third transistor is controlled by the over-discharged signal, and a drain electrode and a source electrode of the third transistor are coupled to the gate electrode of the second transistor and the grounding terminal, respectively.

11. The cell module according to claim 10, wherein the second transistor and the third transistor are N-type MOSFETS.

12. An electronic system comprising:
an electronic device; and
a cell module comprising:
a cell;
a discharge switching circuit, coupled to the cell, comprising at least a first transistor which electrically connects the cell and the electronic device when the cell module discharges; and
a surge current suppressed and controlled circuit used for controlling the discharge switching circuit, wherein the current flowing from the cell into the electronic device gradually increases by the discharge switching circuit when the electronic device is coupled to the discharge switching circuit, wherein the surge current suppressed and controlled circuit comprises:
at least a capacitor, coupled to a source electrode and a gate electrode of the at least the first transistor, wherein a voltage across the at least the capacitor gradually increases to soft turn on the at least the first transistor for discharging of the cell and to suppress the surge current flowing into the electronic device when the cell module discharges electricity to the electronic device.

13. The electronic system according to claim 12, wherein the discharge switching circuit comprises a protection integrated circuit, and when the value of the current flowing into the electronic device is greater than a predetermined value, the protection integrated circuit outputs an over-discharged signal to the surge current suppressed and controlled circuit to cut off the current flowing into the electronic device.

14. The electronic system according to claim 12, wherein the surge current suppressed and controlled circuit is used for controlling the first transistor to be soft turned on to suppress the surge current flowing into the electronic device.

15. The electronic system according to claim 14, wherein the first transistor is a P-type MOSFET.

16. The electronic system according to claim 12, wherein the surge current suppressed and controlled circuit further comprises:
a second transistor, wherein a source electrode of the second transistor is coupled to a grounding terminal when the electronic device is coupled to the discharge switching circuit;
a first resistor, wherein a drain electrode of the second transistor is coupled to the gate electrode of the first transistor via the first resistor; and
a second resistor, wherein a gate electrode of the second transistor is coupled to the source electrode of the first transistor via the second resistor.

17. The electronic system according to claim 16, wherein the second transistor is an N-type MOSFET.

18. The electronic system according to claim 16, wherein the surge current suppressed and controlled circuit further comprises:
a third transistor, wherein the third transistor is controlled by an over-discharged signal, and a drain electrode and a source electrode of the third transistor are coupled to the gate electrode of the second transistor and the grounding terminal, respectively.

19. The electronic system according to claim 12, wherein the discharge switching circuit further comprises a protection integrated circuit, and when the value of the current flowing into the electronic device is greater than a predetermined value, the protection integrated circuit outputs an over-discharged signal to the surge current suppressed and controlled circuit which controls the first transistor to be turned off according to the over-discharged signal.

20. The electronic system according to claim 19, wherein the surge current suppressed and controlled circuit further comprises:
a second transistor, wherein a source electrode of the second transistor is coupled to a grounding terminal when the electronic device is coupled to the discharge switching circuit;
a first resistor, wherein a drain electrode of the second transistor is coupled to the gate electrode of the first transistor via the first resistor;
a second resistor, wherein a gate electrode of the second transistor is coupled to the source electrode of the first transistor via the second resistor; and
a third transistor, wherein the third transistor is controlled by the over-discharged signal, and a drain electrode and a source electrode of the third transistor are coupled to the gate electrode of the second transistor and the grounding terminal, respectively.

21. The electronic system according to claim 20, wherein the second transistor and the third transistor are N-type MOSFETS.

* * * * *